United States Patent
Rubenstein et al.

(10) Patent No.: US 11,975,304 B2
(45) Date of Patent: May 7, 2024

(54) METHOD AND SYSTEM FOR SOLVENTLESS CALIBRATION OF VOLATILE OR SEMI-VOLATILE COMPOUNDS

(71) Applicant: Government of the United States, as represented by the Secretary of the Air Force, Wright-Patterson AFB, OH (US)

(72) Inventors: H. Mitchell Rubenstein, Beavercreek, OH (US); Patrick Lewis, Aburquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 164 days.

(21) Appl. No.: 17/356,795

(22) Filed: Jun. 24, 2021

(65) Prior Publication Data
US 2021/0318276 A1    Oct. 14, 2021

Related U.S. Application Data

(63) Continuation of application No. 16/283,977, filed on Feb. 25, 2019, now abandoned.

(60) Provisional application No. 62/634,351, filed on Feb. 23, 2018.

(51) Int. Cl.
| | | |
|---|---|---|
| B01J 20/10 | (2006.01) | |
| B01J 20/26 | (2006.01) | |
| B01J 20/282 | (2006.01) | |
| B01J 20/283 | (2006.01) | |
| B01J 20/285 | (2006.01) | |
| G01N 30/12 | (2006.01) | |
| G01N 30/86 | (2006.01) | |
| G01N 30/93 | (2006.01) | |
| G01N 30/00 | (2006.01) | |
| G01N 30/32 | (2006.01) | |

(52) U.S. Cl.
CPC .......... *B01J 20/103* (2013.01); *B01J 20/262* (2013.01); *B01J 20/282* (2013.01); *B01J 20/283* (2013.01); *B01J 20/285* (2013.01); *G01N 30/12* (2013.01); *G01N 30/8665* (2013.01); *G01N 30/93* (2013.01); *B01J 2220/54* (2013.01); *G01N 2030/008* (2013.01); *G01N 2030/328* (2013.01)

(58) Field of Classification Search
USPC .............................................. 436/9
See application file for complete search history.

(56) References Cited

PUBLICATIONS

United States Patent and Trademark Office, Non-Final Office Action in U.S. Appl. No. 16/382,977, dated Nov. 12, 2021, 8 pages total.

(Continued)

*Primary Examiner* — Xiaoyun R Xu
(74) *Attorney, Agent, or Firm* — AFMCLO/JAZ; Chastity D. S. Whitaker

(57) ABSTRACT

A system for solventless calibration of volatile or semi-volatile compounds and methods thereof. The system includes a fluid path having a first end configured to be operably coupled to a fluid source and a second end configured to be operably coupled to the analytical instrument. A solid sorbent is disposed along the fluid path and is configured to absorb an analyte. The flow of fluid along the fluid path from the first end to the second end causes absorbed analyte to be desorbed from the solid sorbent at a desired concentration to the instrument.

9 Claims, 12 Drawing Sheets

(56) References Cited

PUBLICATIONS

United States Patent and Trademark Office, Final Office Action in U.S. Appl. No. 16/283,977 dated May 23, 2022, 5 pages total.
United States Patent and Trademark Office, Non-Final Office Action in U.S. Appl. No. 17/356,822 dated Apr. 13, 2023, 8 pages total.

METHOD AND SYSTEM FOR SOLVENTLESS CALIBRATION OF VOLATILE OR SEMI-VOLATILE COMPOUNDS

This application is a continuation of U.S. application Ser. No. 16/283,977 (pending), filed Feb. 25, 2019, which claims the benefit of and priority to prior filed co-pending Provisional Application Ser. No. 62/634,351, filed Feb. 23, 2018. The disclosure of each of these applications is incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention is related to improved analytical techniques useful for the identification and enhanced quantification of chemical species, such as chemical warfare agents.

BACKGROUND OF THE INVENTION

Analytical chemistry is the science of obtaining, processing, and deriving information about a composition of matter. Various instrumentation modalities exist to facilitate obtaining the information, whether qualitative or quantitative, and include, for example, chromatographs, spectrometers, electrochemical cells, microscopy, and so forth.

Before an analytical instrument can return beneficial information, the instrument often requires calibration. Calibration is the comparison of measured values to known values (or standards) and is necessary to obtaining both accurate and precise results. Generally, in analytical chemical applications, a series of standards (known composition, called an analyte, at known concentrations) are evaluated using the analytical instrument to derive a standard curve. Samples of unknown composition or quantity may then be evaluated against the standard curve.

However, there are some difficulties associated with calibrations, particularly when an analysis is performed outside a conventional laboratory setting (e.g., a remote area or a moving vehicle, often referenced as "in the field"). Analysis in the field may be complicated or rendered impossible by little-to-no access to necessary standards. Some standards, such as those associated with volatile or semi-volatile analytes, (organic compounds, such as poly-aromatic hydrocarbons, pesticides, nitrosamines, and organo-phosphates) are particularly challenging because analysis requires these analytes to be infused into devices without the addition of solvents. Yet, conventional analytical instrumentation all require solvents to administer the standards.

Another complicating factor in the field is contamination. Not only must the standards be available, but the quantity of standard must be known before a useful calibration curve may be derived.

Thus, there remains a need for solventless calibration methods and standards that may be used to overcome difficulties associated with analytical work in the field.

SUMMARY OF THE INVENTION

The present invention overcomes the foregoing problems and other shortcomings, drawbacks, and challenges of conventional methods of analyzing chemical species in non-conventional, non-laboratory settings. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a system for solventless calibration of volatile or semi-volatile compounds includes a fluid path having a first end configured to be operably coupled to a fluid source and a second end configured to be operably coupled to the analytical instrument. A solid sorbent is disposed along the fluid path and is configured to absorb an analyte. The flow of fluid along the fluid path from the first end to the second end causes absorbed analyte to be desorbed from the solid sorbent at a desired concentration to the instrument.

According to another embodiment of the present invention a microcalibrator for solventless calibration of an analytical instrument includes a fluid path having a first end configured to be operably coupled to a fluid source and a second end configured to be operably coupled to the analytical instrument. First and second solid sorbents are disposed along the fluid path. The first solid sorbent is configured to absorb an analyte at a first concentration; the second solid sorbent is configured to absorb the analyte at a second concentration. The flow of fluid along the fluid path from the first end to the second end causes absorbed analyte to be desorbed from the first solid sorbent, the second solid sorbent, or both.

Still another embodiment of the present invention includes a microcalibrator for solventless calibration of an analytical instrument having a fluid path having a first end configured to be operably coupled to a fluid source and a second end configured to be operably coupled to the analytical instrument. First and second solid sorbents are disposed along the fluid path. The first solid sorbent is configured to absorb a first analyte; the second solid sorbent is configured to absorb a second analyte. The flow of fluid along the fluid path from the first end to the second end causes the first absorbed analyte, the second absorbed analyte, or both to be desorbed from the first solid sorbent or the second solid sorbent, respectively.

Disclosed is a device for solventless calibration utilizing a removable analyte source and a pre-concentrator with a solid sorbent. The device is configured to then vaporize absorbed analyte from the solid sorbent and to direct the vaporized analyte to an analytical instrument, such as a spectrometer. The micro-concentrator may include a MEMS-based micro hotplate having a discrete amount of solid sorbent on the hotplate. The device may include various valves and filters for controlling flow through the device and reducing the risk of contamination of the analyte. The device may include a T-junction for adding additional air to the fluid stream after the micro-concentrator. The device may include a controller for fixing the amount of time that fluid source flows along the fluid path, a data port operably connected to a controller, a button for causing the analyte to exit the device, or combinations thereof.

The device may also utilize multiple micro-concentrators operating in parallel. In such instances, the device may allow each micro-concentrator to absorb analyte from the removable analyte source at a respective fixed concentration.

The device may also control a split valve along the fluid path after the micro-concentrator to allow a variable concentration of the analyte to pass to the analytical instrument.

Yet another embodiment of the present invention is directed to a method for solventless calibration by loading a solid sorbent with an analyte and then initiating a fluid flow through the solid sorbent such that analyte desorbs from the solid sorbent. The fluid flow with the desorbed analyte is directed to an analytical instrument.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 7-10 are chromatographs resulting from the replications of low, medium, and high concentration of analyte using the calibration curve of FIG. 6.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The disclosed invention is drawn to a device and method for solventless calibration, and specifically to a device and method that use a solid sorbent to absorb analyte from a removable analyte source, some or all of which is later vaporized and provided to an instrument, such as a spectrometer.

Figure 1:
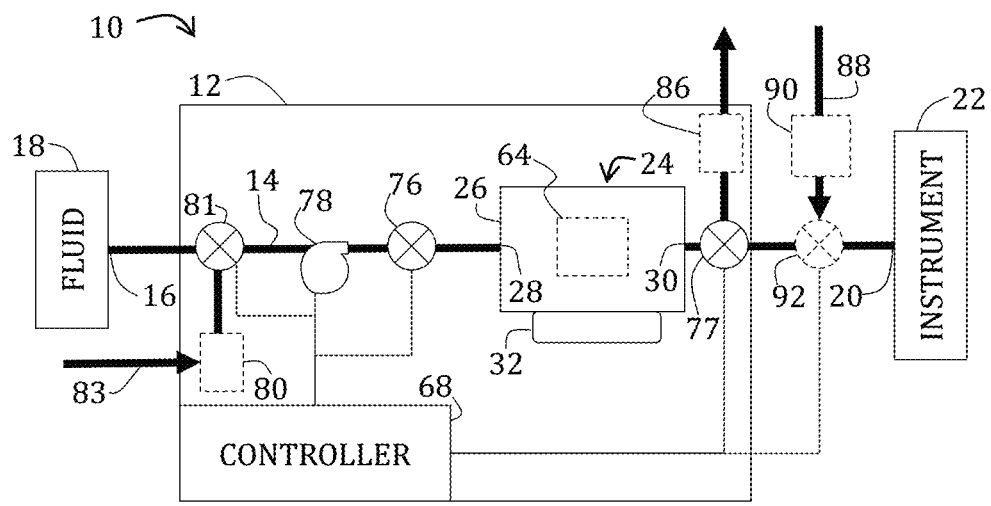
FIG. 1 is a diagrammatic view of a solventless calibration system according to an embodiment of the present invention.

Referring now to the figures, and in particular to FIG. 1, a microcalibrator 10 according to one an embodiment of the present invention is shown and includes a housing 12 and a fluid path 14 extending through the housing 12. The housing 12 may be constructed from a durable material to protect sensors, electronics, and other components within the housing 12. The housing 12 may also provide insulation from external conditions. In some embodiments, the housing 12 may be sealed such that the components therein are waterproof or water resistant. The housing 12 may also include space or connections for a power supply, removable battery, fuel cell, or other power source components therein.

A first end 16 of the fluid path 14 is configured to be operably coupled to a fluid source 18; a second end 20 of the fluid path 14 is configured to be operably coupled to an instrument 22. Exemplary fluids of the fluid source 18 may be air or an inert gas (such as $CO_2$ or $O_2$), or any other fluid that may be used to transport an analyte of interest. The instrument 22 may be, for example, a gas chromatograph ("GC"), a GC-Mass Spectrometer ("GC-MS"), or other known instrumentation. In one example, an Agilent 6890 with a split/splitless inlet and a nitrogen-phosphorus detector ("NPD") may be utilized.

Figure 2:
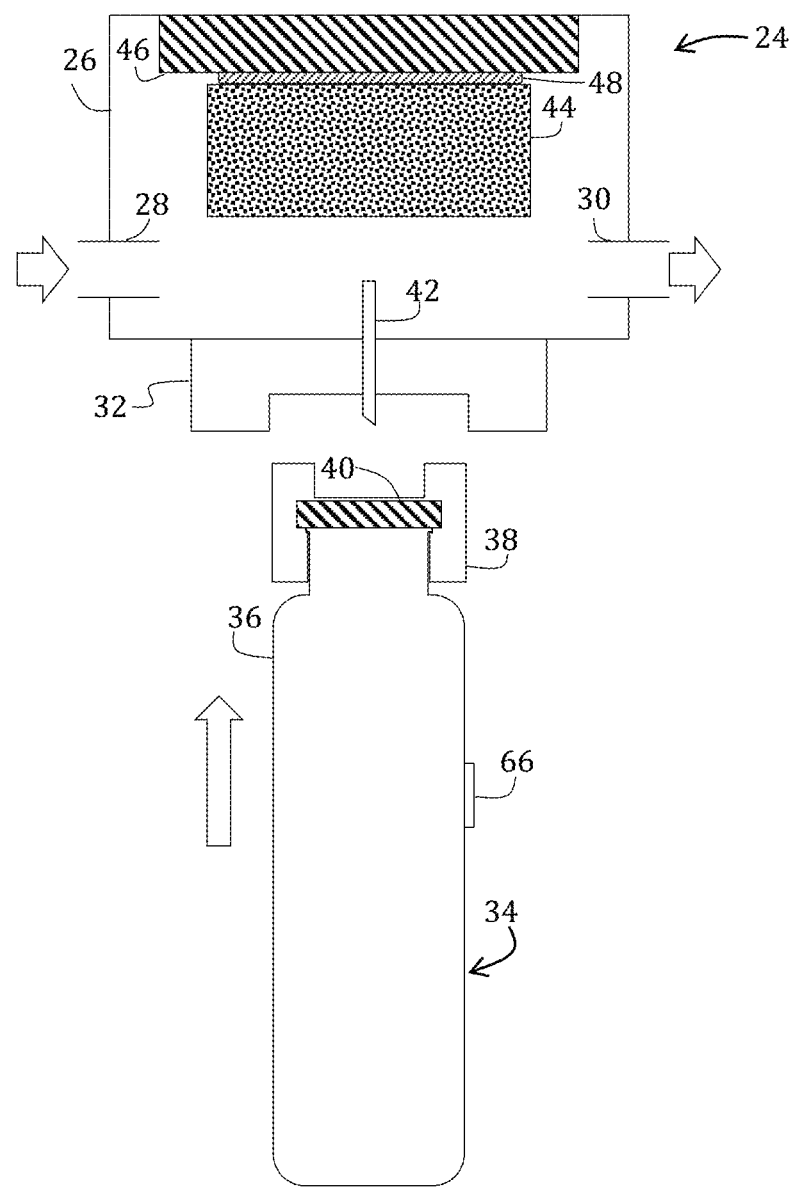
FIG. 2 is a diagrammatic view of an embodiment of a pre-concentrator with an exemplary analyte source.

Referring now to both FIGS. 1 and 2, the microcalibrator 10 further includes a micro-concentrator 24 within the housing 12 and in fluid communication with the fluid path 14. The micro-concentrator 24 may include a housing 26 having an inlet port 28 configured to receive fluid from the fluid path 14, an outlet port 30 configured to eject fluid into the fluid path 14, and a hub 32 that is configured to receive an analyte source 34. While the illustrated embodiment should not be considered to be limiting, the analyte source 34 may comprise a container 36 having a cap 38 with pierceable septum 40 such that a needle 42 operably coupled to the hub 32 may pierce the cap 38 and permit analyte to move from the container 36 and into the housing 26 of the micro-concentrator 24. However, other analyte storage devices and mechanism are known and may be implemented as needed.

The micro-concentrator 24 further comprises a solid sorbent 44 positioned within the housing 26. The solid sorbent 44 is configured to absorb analyte. For example, when the septum 40 of the analyte source 34 is pierced, analyte may flow into the housing 26 of the micro-concentrator 24 and be absorbed into the solid sorbent 44. As is known in the art, porosity and selectivity of a solid sorbent may be tailored. Exemplary solid sorbent compositions may include graphitized carbon black ("GCB"), activated carbon, porous polymers (such as 2,6-diphenyl-p-phenylene oxide), or a xerogel (such as $SiO_2$). Methods for synthesizing and tailoring solid sorbent compositions are known, for example, such as in U.S. Pat. No. 5,858,457, entitled PROCESS TO FORM MESOSTRUCTURED FILMS, incorporated by reference herein in its entirety. Other solid sorbent compositions may include commercially-available materials, such TENAX, HAYESEP, CHROMASORB, for example.

Still referring to FIGS. 1 and 2, an amount of analyte absorbed into the micro-concentrator 24 depends on an amount of solid sorbent 44 therein as well as the tailored character of the solid sorbent composition. According to some embodiments, such as the one illustrated in FIG. 2, the solid sorbent 44 may be supported by or otherwise attached to a plate 46 (illustrated with an adhesive 48 attaching the solid sorbent 44 to the plate 46); however, it would be understood by those of ordinary skill in the art having the benefit of the disclosure made herein that the plate 46 may not be required in all embodiments. If fact, according to some embodiments, the solid sorbent 44 may be coupled to any internal wall of the housing 26 of the micro-concentrator 24 or otherwise suspended within a volume of the housing 26.

The plate 46 may comprise a thin, silicon nitride (SiN) substrate having a patterned metal heating element (not shown) deposited thereon. Alternatively, the plate 46 may comprise a substrate operable as a resistive heater. Regardless of the particular structure of the plate 46, the plate 46 should be configured to be heated or otherwise provide heat to the solid sorbent 44 such that upon heating, analyte thermally desorbs from the solid sorbent 44. Heating of the plate 46 may include, for example, the application of a small amount of current to the patterned metal heating elements.

Figure 3:
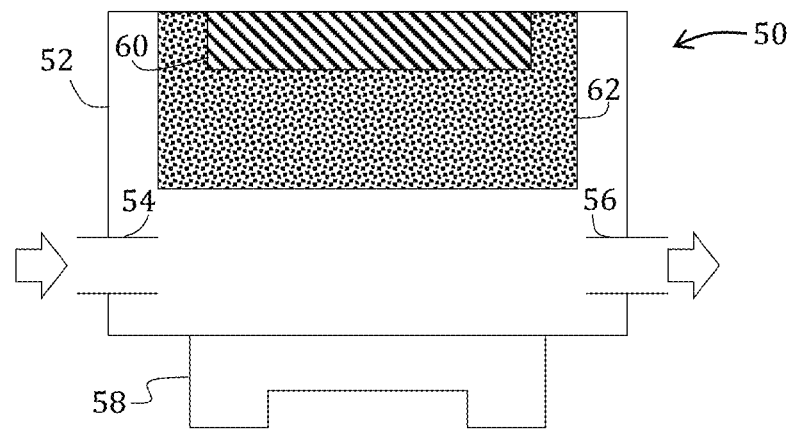
FIG. 3 is a diagrammatic view of another embodiment of a pre-concentrator.

In yet other embodiments, the solid sorbent and plate may comprise a unitary structure. For example, FIG. 3 illustrates a micro-concentrator 50 having a housing 52 with an inlet 54, an outlet 56, and a hub 58. A plate 60 within the housing may comprise a SiN substrate that is coated with a solid sorbent composition, such as a template, porous xerogel. As a result, the solid sorbent 62 surrounds, covers, or otherwise encloses the plate 60. According to this illustrated and related embodiments, the plate 60 may be dip-, spray-, or spun-coated with the solid sorbent 62. According to other embodiments, the solid sorbent 62 may be synthesized directly onto the plate 60. For example, precursor sols for coating the plate 60 may be prepared by the addition of a cationic surfactant (CTAB $CH_3(CH_2)_{15}N(CH_3)_3Br$) to a silica sol in a two-step acid-catalyzed process. In a first step, a solution of TEOS ($Si(OC_2H_5)_4$), ethanol, water, and HCl at mole ratios $1:3.8:1:5\times10^{-5}$ may be refluxed at 60° C. In a second step, performed at room temperature, water may be added and [HCl] increased to about 0.01 M, which corresponds to the minimum average siloxane condensation rate. After stirring for 15 min at 25° C., the sols may be aged at 50° C. for up to 8 hrs and diluted with 2 equivalents of ethanol. CTAB may then be added, in varying quantities, corresponding to concentrations, $c_o$, ranging from 0.03 M to 0.11 M (1 wt % to 5 wt %). The final reactant mole ratios TEOS:EtOH:$H_2O$:HCl:CTAB were 1:22:5:0.004:0.093-0.31.

Referring now again to FIGS. 1 and 2, and optionally according to some embodiments, the micro-concentrator 24 may include an RFID reader 64 that is configured to read an RFID chip 66 of the analyte source 34 such that information about the particular analyte source 34 may be recorded or read by the micro-concentrator 24. Information transmitted may include, for example, type of analyte being used, a lot number associated with analyte synthesis or containment, time at which the analyte source 34 is attached to the micro-concentrator 24, a number of injections, and other information that may be useful for validation and quality assurance purposes. Those of ordinary skill in the art would readily appreciate that alternative devices may also be used. For example, QR code, bar codes, and other such mechanisms may be used in lieu of the RFID reader 64 and chip 66. Moreover, it would be understood that the RFID reader 64 need not be coupled to the micro-concentrator 24, but instead the reader 64 could be incorporated into a controller 68 or other structural component of the microcalibrator 10.

In some embodiments, signals received via a data port may signal to the controller 68 that the instrument 22 is operably coupled to the microcalibrator 10, the data port may receive control signals, data, or information from the instrument 22, a computer, or other source, or both. Control signals may indicate sample size desired, timing for when the analyte is required, the concentration of analyte required, etc. In some embodiments, the controller 68 may be programmed to make calculations related to these inputs (such as receiving a request for a certain concentration of an analyte and determining operation of pumps, valves, etc.). In other embodiments, control signals may be used to operate the controller 68 according to particular operating parameters, and the controller 68 implements the provided instructions.

Figure 4:
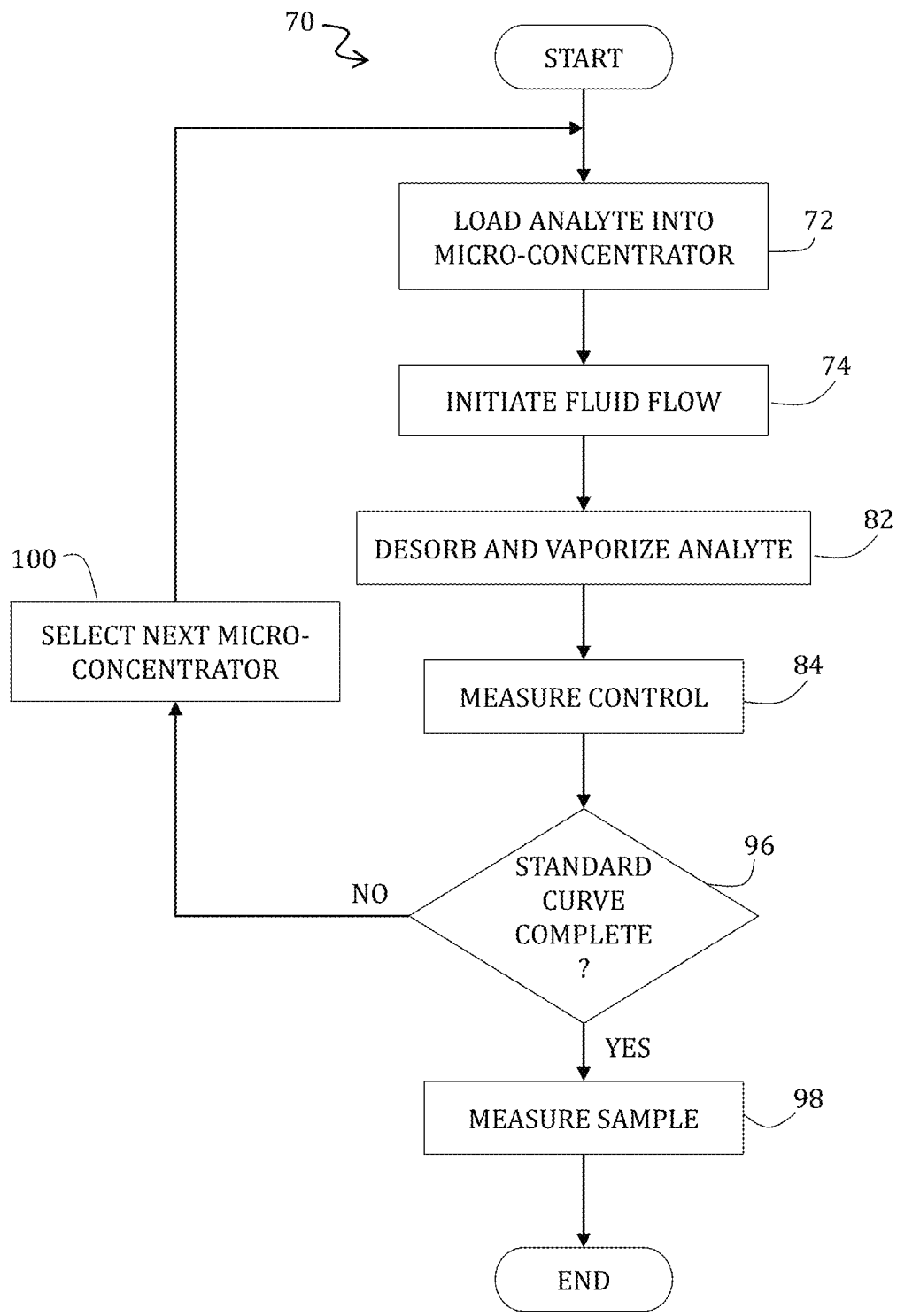
FIG. 4 is a flowchart describing a method of using a solventless system according to an embodiment of the present invention.

Still referring to FIGS. 1 and 2 along with FIG. 4, a method 70 of using the microcalibrator 10 according to an embodiment of the present invention is described. At start, analyte may be loaded into the micro-concentrator 24 (Block 72). According to the illustrated embodiment, analyte may be loaded by coupling the analyte source 34 to the micro-concentrator 24, at the hub 32, so that analyte may flow into the micro-concentrator 24 and absorb onto the solid sorbent 44. As described in detail above, an amount of analyte absorbed by the solid sorbent 44 depends on a volume of the solid sorbent 44 and the particularly tailored character of the solid sorbent composition.

With the solid sorbent 44 wetted (the sorbent 44 may be fully wetted to saturation but it is not required), flow from the fluid source 18 and into the microcalibrator 10 may be initiated (Block 74). In this regard, and according to the illustrated embodiment, the controller 68 may be configured to open one or more valves 76, 77, 81, operate a pump 78, or combinations thereof to permit fluid flow from the fluid source 18 to the micro-concentrator 24. However, it would be understood that the operation of valves, pumps, and the like would depend on the particular embodiment of the microcalibrator used.

While a flow rate of the fluid may be varied according to a particular need or preference, in some embodiments the flow rate through the micro-concentrator may be less than about 500 mL/min. In other embodiments, the flow rate may range from about 5 mL/min to about 100 mL/min; and in still other embodiments, the flow rate may range from it is between about 5 mL/min and about 20 mL/min.

Optionally, and as would be understood by those of ordinary skill in the art, a gas trap 80 with associated valve 81 may be incorporated between the fluid source 18 and the micro-concentrator 24 as a source of air to the fluid path 14. The gas trap 80 may draw in purified air along a separate line 83 or, otherwise, the line 83, the gas trap 80, or both may include a filter for purification and removal of contaminants during air flow. For example, the trap 80 may be used to remove hydrocarbons, moisture, oxygen, or other elements in order to reduce the risks of column damage, loss of instrument sensitivity, or instrument downtime. In those embodiments in which the fluid is ambient air, the trap 80 may be used to remove the analyte of interest such that the only analyte permitted into the micro-concentrator 24 is from the analyte source 34.

Analyte may then be desorbed from the solid sorbent 44 and vaporized for movement to the instrument 22 (Block 82). While the manner by which the analyte desorbs is dependent on the particular solid sorbent composition, in the illustrated embodiment of FIG. 2, fluid flow, resistive heating, or both may be used to release the analyte from the solid sorbent 44. As noted above, desorption may include the control of the valves 76, 77, 81, the pump 78, resistive heaters (not shown) or other structural elements that depend on the particular embodiment.

With the analyte vaporized, the analyte may be directed to the instrument 22 for measurement of the control (Block 84), which may include the control of the valves 76, 77, 81, the pump 78, or combinations thereof. According to some embodiments, control of the valve 77 may include an option to vent a portion of the flow to a carbon filter 86 so as to remove excess analyte or to flush the fluid path 14. In some embodiments, the valve 77 may be configured to provide variable concentration of the analyte to the instrument 20. For example, if the valve 77 is a split valve, then the controller 68 may be configured to control the split valve to control a quantity of fluid flowing to the instrument 20.

According to some embodiments, the flow rate through the micro-concentrator 24 may be less than an optimal or necessary flow rate utilized by the instrument 20. For example, as noted above, the flow rate through the micro-concentrator 24 may be less than 50 mL/min while the operable range of fluid flow through some analytical instruments may be greater than 100 mL/min. As such, a supplemental line 88 with an optional filter 90 (such as a carbon filter) may provide additional flow. An additional valve 92 may control the additional flow into the vaporized analyte.

Once the analyte (control) is measured and an instrument response recorded, it may be determined whether enough data has been acquired for a standard curve (Decision Block 96). The number of control measurements necessary or desired for a standard curve varies, generally three or more control measurements are preferred. In that instance ("Yes" branch of Block 96), the sample (or unknown) may be evaluated using the instrument 22 (Block 98) and the process may end. Otherwise ("No" branch of Block 96), a next micro-concentrator may be selected (Block 100). The next micro-concentrator may be similar to the microcalibrator 10 of FIG. 1; however, the next micro-concentrator has a solid sorbent that is configured to absorb the analyte at a concentration that is different from the solid sorbent 44 of the previous microcalibrator 10. As noted above, the amount of analyte absorbed depends on an amount and tailored character of the solid sorbent composition. The procedure then returns to loading analyte into the next micro-concentrator.

For example, a calibration curve generally requires at least a low concentration of the analyte and a high concentration of the analyte. Thus, according to this particular embodiment, first pre-concentrator with very little solid sorbent to provide the low concentration sample, and a second pre-concentrator with a large quantity of solid sorbent to provide the high concentration sample.

In some embodiments, the method may involve closing an isolation valve immediately after the analyte is directed to the instrument 22.

In some embodiments, the fluid flow passes to a thermal desorption tube or probe prior to reaching the instrument 22.

In some embodiments, other optional elements may be included. For example, the device may include a data port operably connected to the controller 68, which enables, for example, the controller 68 to receive firmware updates or to send information as needed. Alternatively, the controller 68 may include devices configured for wireless communication.

In some embodiments, the microcalibrator 10 may include a display or a light. For example, while analyte is loading onto the solid sorbent 44, a "wait" light may illuminate, or a "wait" message may be displayed; then, when the analyte loading has completed, a "ready" light may illuminate or a "ready" message may be displayed. Additionally or alternatively, the microcalibrator 10 may include a button that signals to the controller 68 to begin directing the analyte towards the instrument 20.

According to still other embodiments, and rather than selecting a next microcalibrator as described above, the controller 68 may be used to control one or more of the valves 77, 92 such that a known, controlled flow of the analyte may be combined with a known, controlled flow of fluid along the supplemental line 88 such that the ratio of analyte to fluid may be altered. It would be understood by those of ordinary skilling the art having the benefit of the disclosure made herein that the solid sorbent 44 (FIG. 2) of the micro-concentrator 24 should be capable of absorbing a high concentration of analyte. In that way, dilutions of the maximum analyte concentration can be made by the ratio of the analyte to fluid.

While not explicitly illustrated herein, it may be beneficial, such as between analytes or after completion of use, to flush the microcalibrator 10. One manner of doing so, according to one embodiment, may be to open the valves 76, 77, 81 and the pump 78 may be operated, without the introduction of analyte, such that fluid may be directed from the fluid source 18 and vented to atmosphere.

Figure 5:
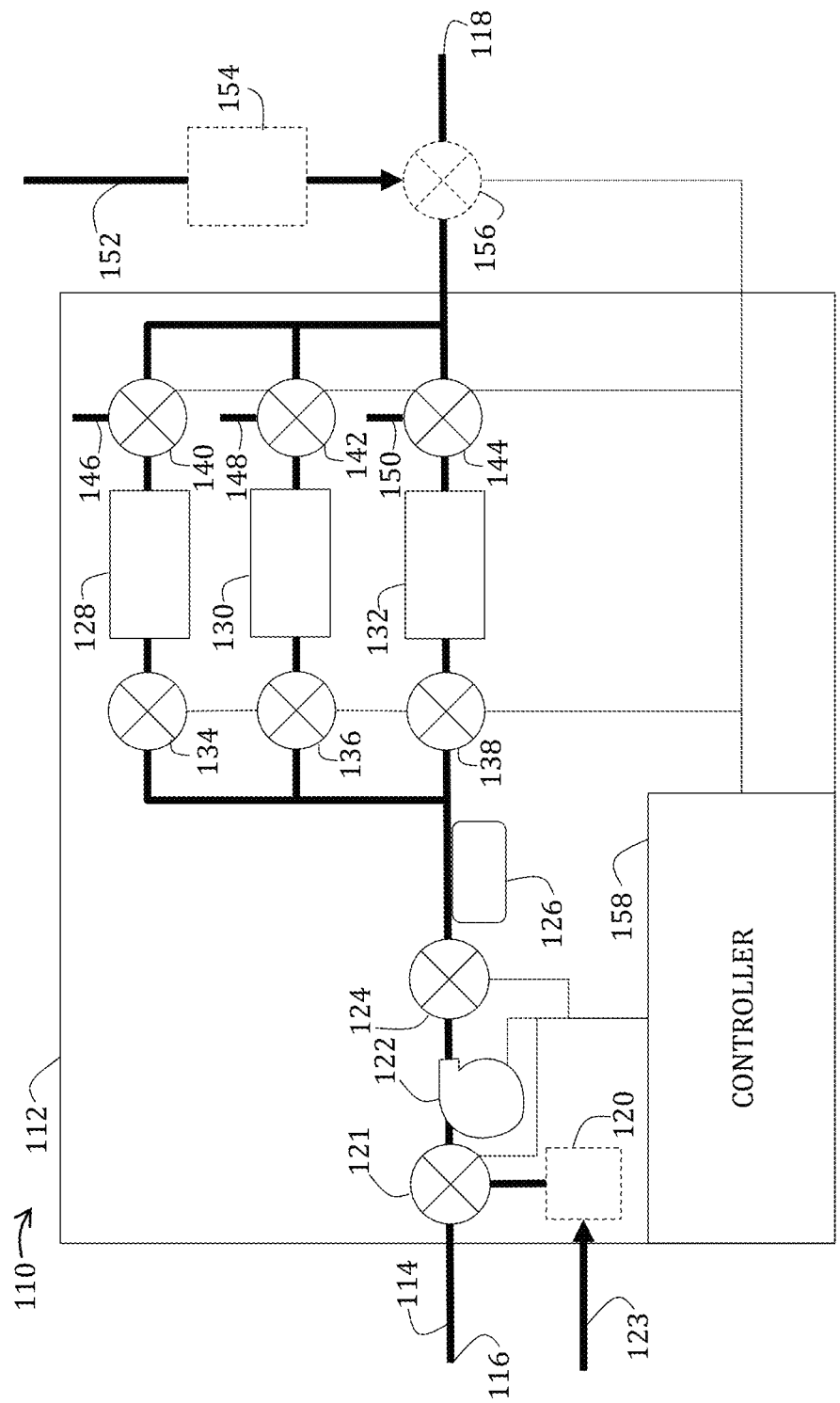
FIG. 5 is a diagrammatic view of another solventless calibration system according to another embodiment of the present invention.

Referring now to FIG. 5, a microcalibrator 110 according to another embodiment of the present invention is shown and includes a housing 112 and a fluid path 114 extending through the housing 112. A first end 116 of the fluid path 114 is configured to be operably coupled to the fluid source 18 (FIG. 1); a second end 118 of the fluid path 114 is configured to be operably coupled to the instrument 22 (FIG. 1). The fluid path 114 may include one or more of a gas trap 120 with its valve 121 and inlet line 123, a pump 122, and a valve 124 as was described with reference to the illustrative embodiment of FIG. 1.

The particular microcalibrator 110 illustrated in FIG. 5 includes a hub 126 that is operably and fluidically coupled to the fluid path 114. The hub 126 may be configured in the manner described previously but, as provided here, the analyte would flow directly into the fluid path 114 as opposed to the micro-concentrator 24 (FIG. 1). Downstream of the hub 126, the fluid path 114 may branch such that a first micro-concentrator 128, a second micro-concentrator 130, and a third micro-concentrator 132 may be arranged in parallel. Corresponding first, second, and third valves 134, 136, 138 may be used to direct flow of analyte from the fluid path 114 to a particular one of the first, second, or third micro-concentrators 128, 130, 132.

The first, second, and third micro-concentrators 128, 130, 132 may be according to any of the various embodiments described herein. In fact, the first, second, and third micro-concentrators 128, 130, 132 may have similar structures according to a specific embodiment or may have differing structures according to a plurality of embodiments. For example, one or more of the micro-concentrators 128, 130, 132 may include a MEMS-style heater plate 46 (FIG. 1), have solid sorbent grown 62 onto the plate 60 (as shown in FIG. 3), no plate (not shown), and so forth. Generally, the first, second, and third micro-concentrators 128, 130, 132 may vary by solid sorbent composition therein (not shown in FIG. 5) such that each of the first, second, and third micro-concentrators 128, 130, 132 absorbed a different concentration of analyte. In this way, a single microcalibrator 100 may be used for establishing a three-point calibration curve. However, additional micro-concentrators may be included or a plurality of the microcalibrators 110 may be used for establishing a six-point or a nine-point calibration curve, for example.

Downstream of each micro-concentrator 128, 130, 132 there may be a corresponding valve 140, 142, 144 and vent 146, 148, 150 to control a flow of analyte to the instrument 22 (FIG. 1). A supplemental line 152 with an optional filter 154 (such as a carbon filter) may provide additional flow. An additional valve 156 may control the additional flow into the vaporized analyte. A controller 158 may be included to control valves 124, 134, 136, 138, 140, 142, 144, 156, the pump 122, or other additional features according to other embodiments of the present invention. Thus, signals from the controller 158 may operate the various valves 124, 134, 136, 138, 140, 142, 144, 156 and/or the pump 122 to provide fluid to one or more of the micro-concentrators 128, 130, 132 in order to direct a known quantity of the analyte to the instrument 22 (FIG. 1).

Figure 6:
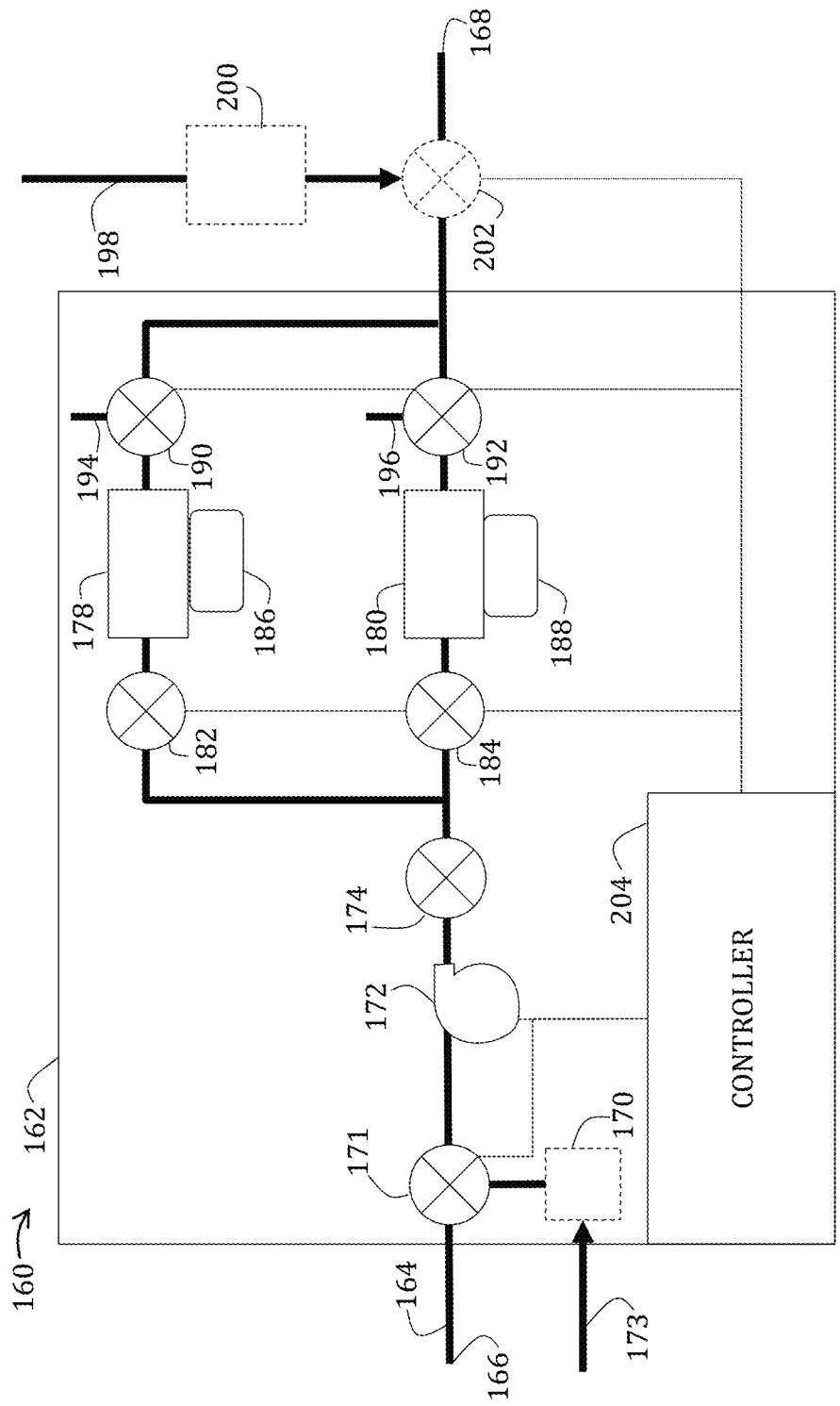
FIG. 6 is a diagrammatic view of a solventless calibration system according to yet another embodiment of the present invention.

Turning now to FIG. 6, a microcalibrator 160 according to still another embodiment of the present invention is shown and includes a housing 162 and a fluid path 164 extending through the housing 162. A first end 166 of the fluid path 164 is configured to be operably coupled to the fluid source 18 (FIG. 1); a second end 168 of the fluid path 164 is configured to be operably coupled to the instrument 22 (FIG. 1). The fluid path 164 may include one or more of a gas trap 170 with its valve 171 and inlet line 173, a pump 172, and a valve 174 as was described with reference to the illustrative embodiment of FIG. 1.

For the particular microcalibrator 160 illustrated in FIG. 6, the fluid path 164 may branch such that a first micro-concentrator 178 and a second micro-concentrator 180 may be arranged in parallel. Corresponding first and second valves 182, 184 may be used to direct flow of analyte from the fluid path 164 to a particular one of the first and second micro-concentrators 178, 180.

Unlike the microcalibrator 110 of FIG. 5, each of the first and second micro-concentrators 178, 180 includes a hub 186, 188 in the manner described in FIGS. 1 and 2. This particular embodiment permits two analyte sources (not shown in FIG. 6) to be coupled to the first and second micro-concentrators simultaneously.

The first and second micro-concentrators 178, 180 may be according to any of the various embodiments described herein. In fact, the first and second micro-concentrators 178, 180 may have similar structures according to a specific embodiment or may have differing structures according to a plurality of embodiments. For example, one or more of the micro-concentrators 178, 180 may include a MEMS-style heater plate 46 (FIG. 1), have solid sorbent grown 62 onto the plate 60 (as shown in FIG. 3), no plate (not shown), and so forth. Generally, the first and second micro-concentrators 178, 180 may vary by solid sorbent composition therein (not shown in FIG. 6) such that each of the first and second micro-concentrators 178, 180 absorbed a different concentration of analyte Downstream of each micro-concentrator 178, 180 there may be a corresponding valve 190, 192 and vent 194, 196 to control a flow of analyte to the instrument 22 (FIG. 1). A supplemental line 198 with an optional filter 200 (such as a carbon filter) may provide additional flow. An additional valve 202 may control the additional flow into the vaporized analyte. A controller 204 may be included to control valves 174, 182, 184, 190, 192, 202, the pump 172, or other additional features according to other embodiments of the present invention. Thus, signals from the controller 204 may operate the various valves 174, 182, 184, 190, 192, 202 and/or the pump 172 to provide fluid to one or more of the micro-concentrators 178, 180 in order to direct a known quantity of the analyte to the instrument 22 (FIG. 1).

While in some embodiments of the present invention the device and method may be used semi-autonomously for use with a wide variety of field equipment. In other embodiments the device and method can be configured for autonomous use, where it is either independent of instrumentation, or is attached to an instrument.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

Three microcalibrator according to an embodiment of the present invention were used to provide dimethyl methyl phosphonate ("DMMP"), a simulant of sarin ("GB"), standard to a gas chromatograph. Each microcalibrator was configured to provide a distinct, pre-established concentration of standard as described herein.

Figure 7:
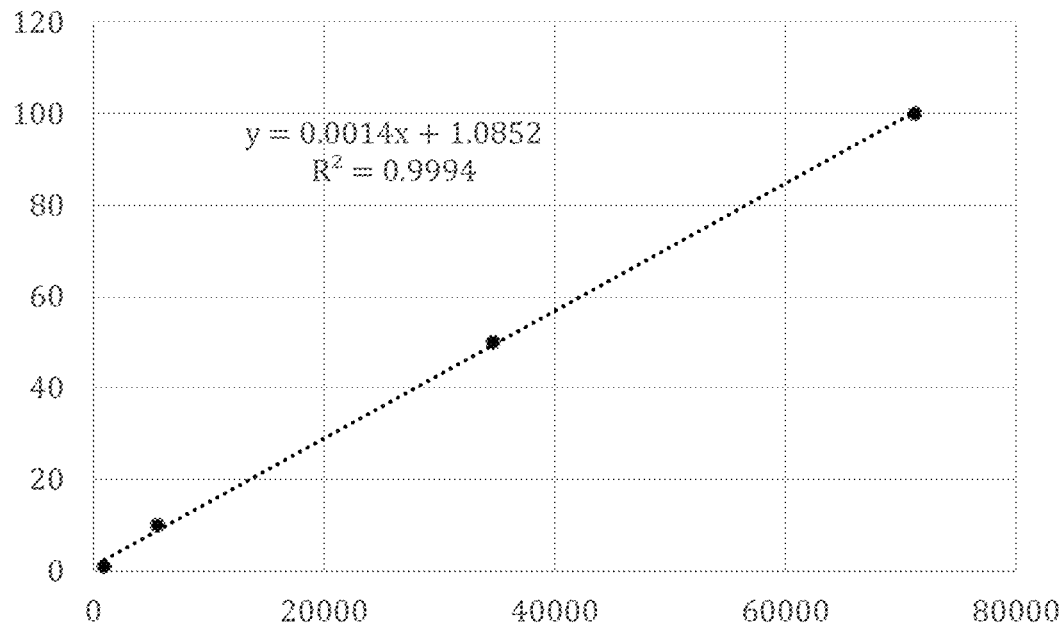
FIG. 7 is a graphical representation of a calibration curve obtained using a convention injection method.

FIG. 7 is a graphical representation of a calibration curve resulting from conventional analyte injection methods.

Figure 8:
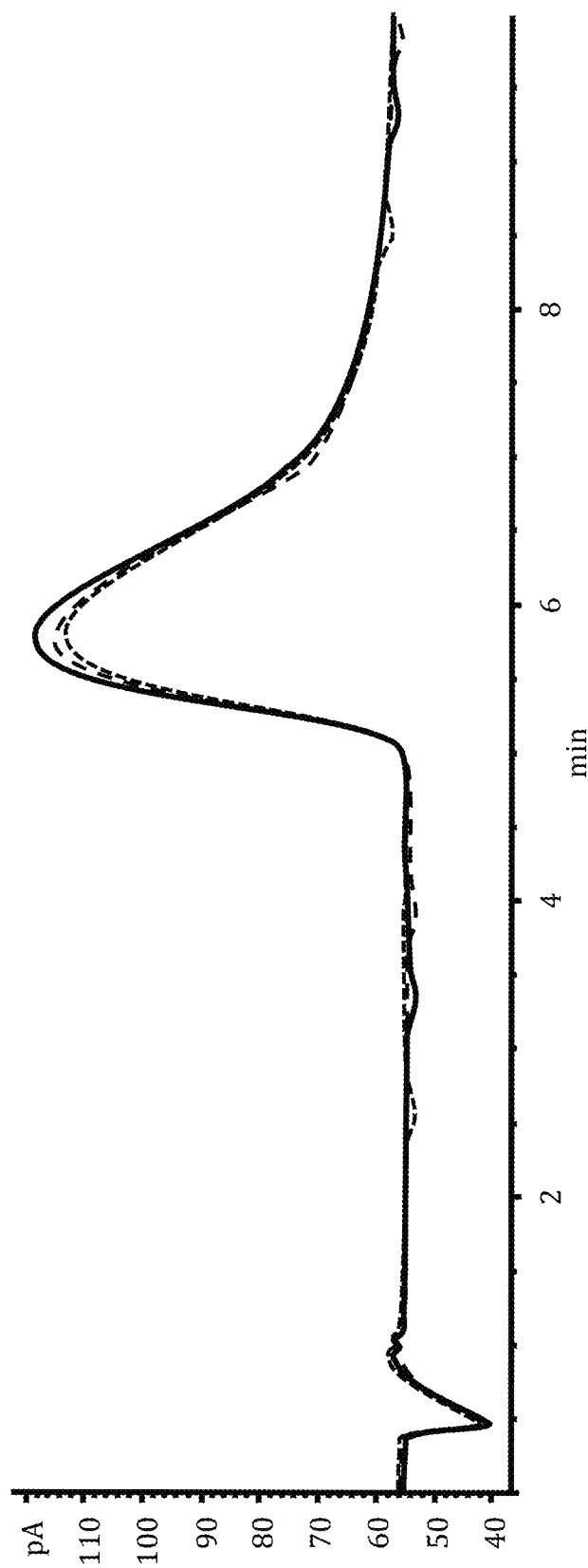
Figure 9:
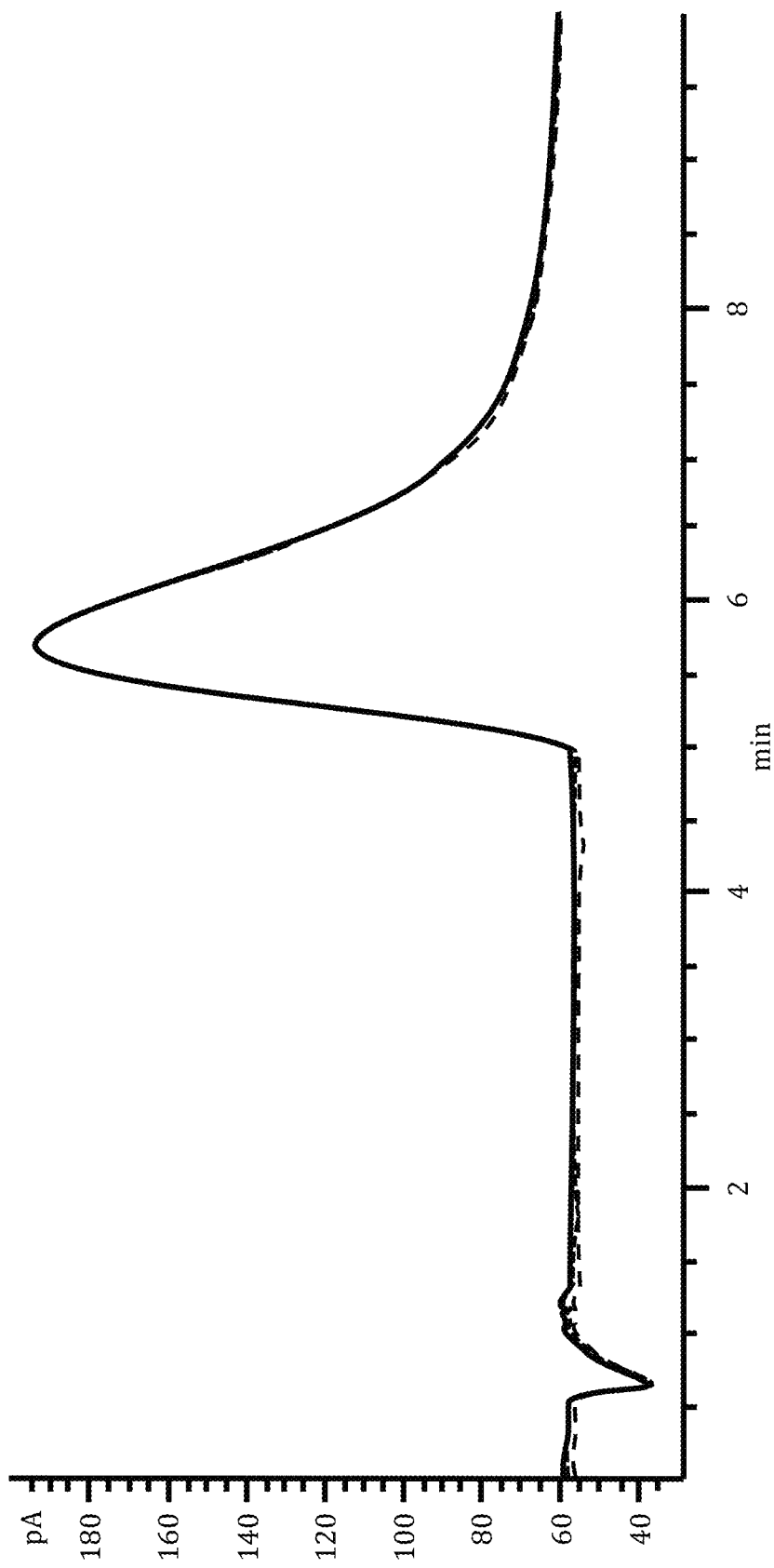
Figure 10:
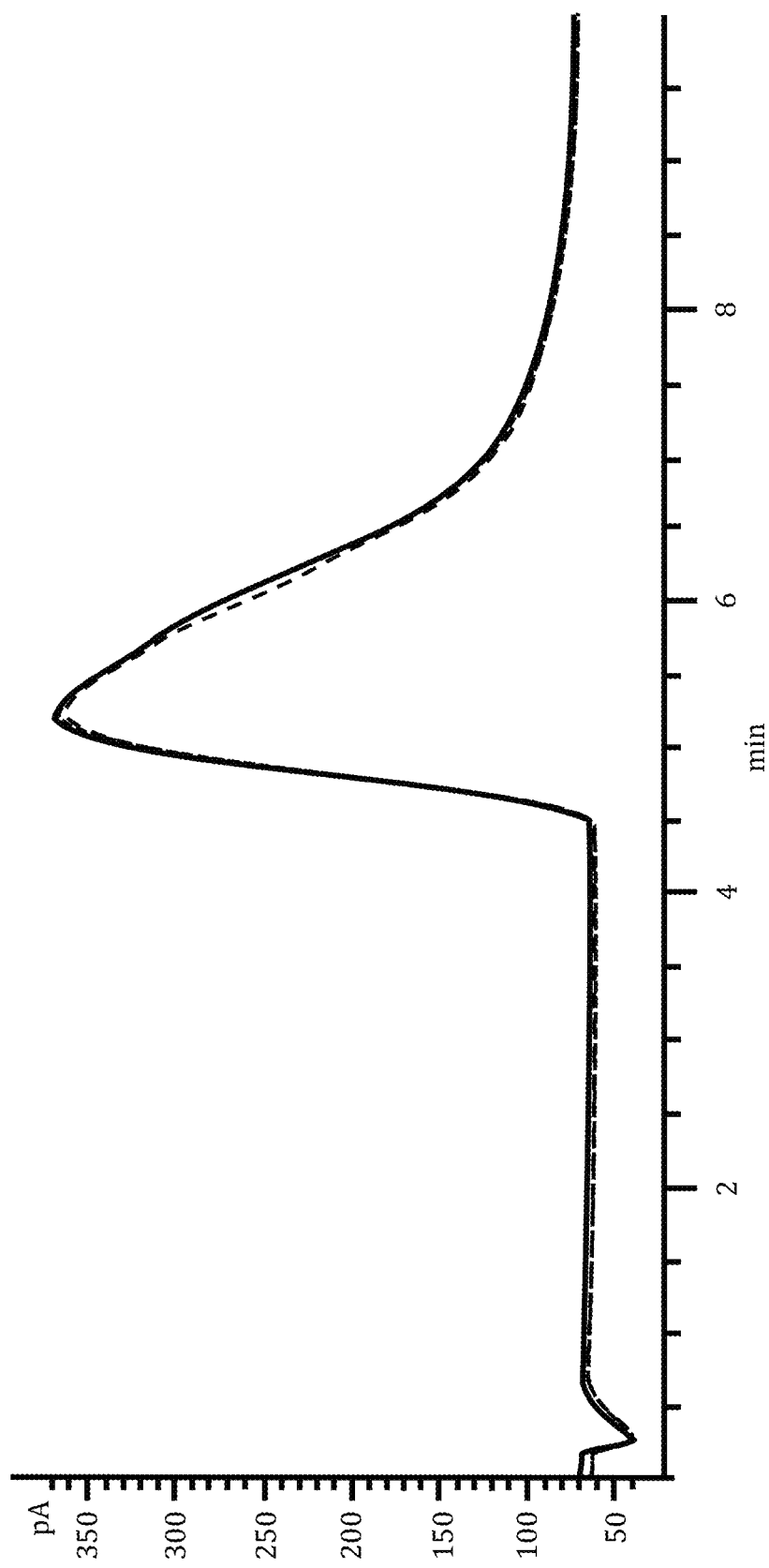

Using the calibration curve of FIG. 7, replications of 10 ng, 20 nm, and 30 nm samples were tested. FIGS. 8, 9, and 10 graphically illustrate the resultant data, respectively, which are also presented in tabular format, below.

Figure 11:
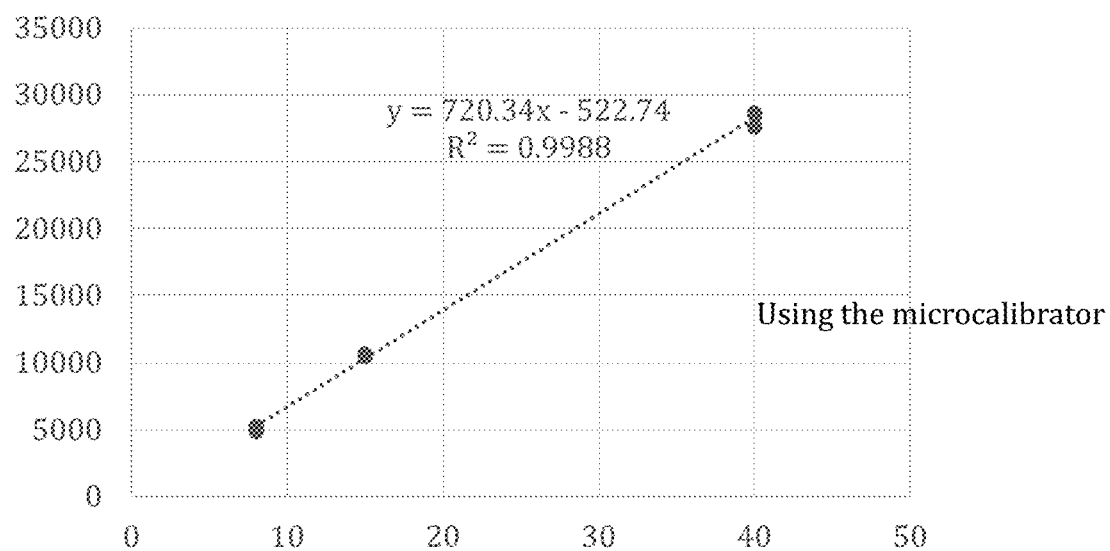
FIG. 11 is a graphical representation of a calibration curve obtained using a solventless calibration system according to an embodiment of the present invention.

FIG. 11 is a calibration curve resulting from the injection of analyte from a microcalibrator according to an embodiment of the present invention.

|  | Area | Measured ng |
|---|---|---|
| 10 nm Replicate |  |  |
| Dashed line | 5052 | 8.13 |
| Dotted line | 4835.2 | 7.83 |
| Solid line | 5225.7 | 8.37 |
| SD | 195.7 | 0.3 |
| Average | 5037.9 | 8.1 |
| % Relative SD | 3.88 | 3.36 |
| 20 nm Replicate |  |  |
| Dashed line | 10638 | 15.92 |
| Dotted line | 10545 | 15.79 |
| Solid line | 10442 | 15.64 |
| SD | 98.0 | 0.1 |
| Average | 10541.7 | 15.8 |
| % Relative SD | 0.93 | 0.87 |
| 40 nm Replicate |  |  |
| Dashed line | 27570 | 39.52 |
| Dotted line | 28636 | 41.01 |
| Solid line | 28496 | 40.82 |
| SD | 579.3 | 0.8 |
| Average | 28234.0 | 40.5 |
| % Relative SD | 2.05 | 2.00 |

Example 2

A microcalibrator according to an embodiment of the present invention was used to supply a semi-volatile, methyl salicylate to a photoionization detector (here, the ppbRae device from RAE Systems Co., Sunnyvale, CA). Data presented in the table, below, demonstrate the reliability of the microcalibrator in providing standards at two concentrations (two concentrations were used because the lower level was below the sensitivity of the instrument) to two different detectors:

| Concentration | Micro-Calibrator | | | |
|---|---|---|---|---|
| | Medium | | High | |
| (ng) | Avg Peak (ppb) | SD | Avg Peak (ppb) | SD |
| 1625 | 41.59 | 3.62 | 147.82 | 15.31 |
| 1622 | 30.09 | 3.40 | 113.53 | 9.45 |

Example 3

Figure 12:
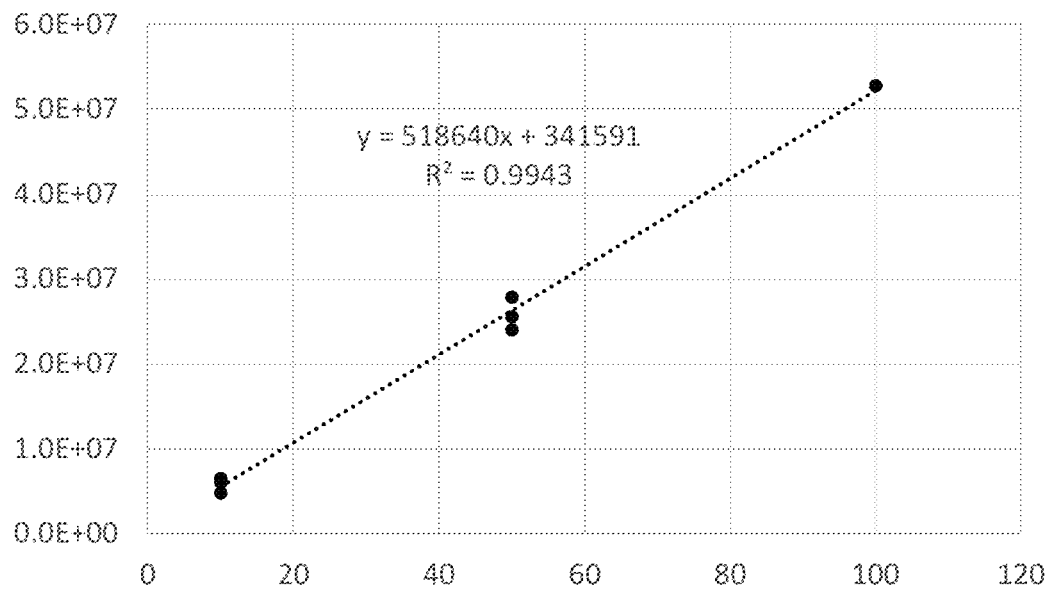
FIGS. 12 and 13 are graphical representations of calibration curves of thermal desorption tubes acquired by direct injection and by using a solventless calibration system according to an embodiment of the present invention.
Figure 13:
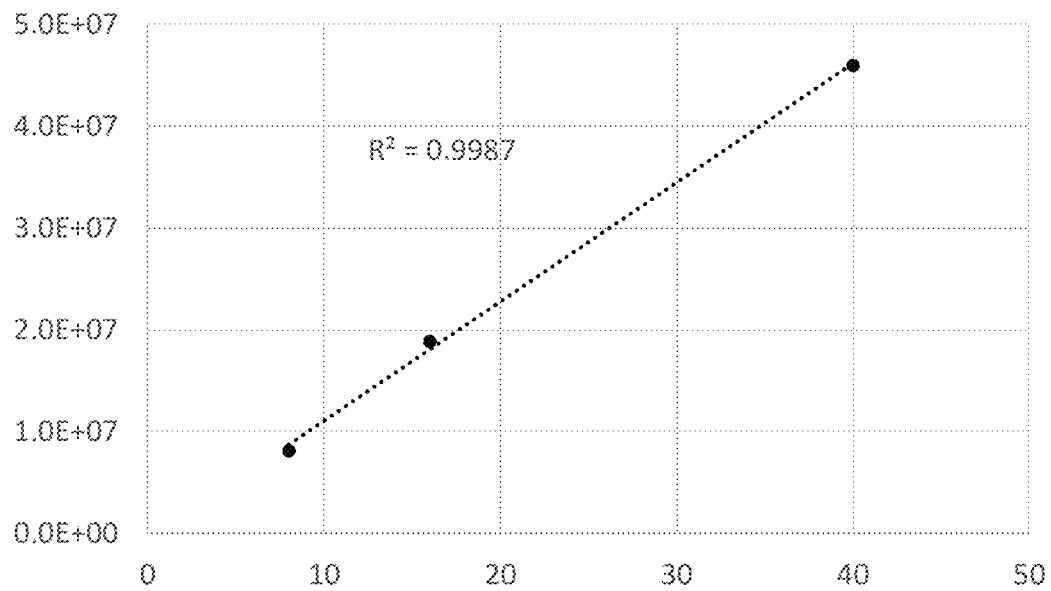

FIGS. 12 and 13 are calibration curves resulting from the use of a HAPSITE ER in calibrating thermal desorption tubes. FIG. 12 is the calibration curve resulting from manual injections of 10 ng, 50 ng, and 100 ng standards. FIG. 13 is the calibration curve resulting from injections made using a microcalibrator according to an embodiment of the present invention.

Example 4

Figure 14:
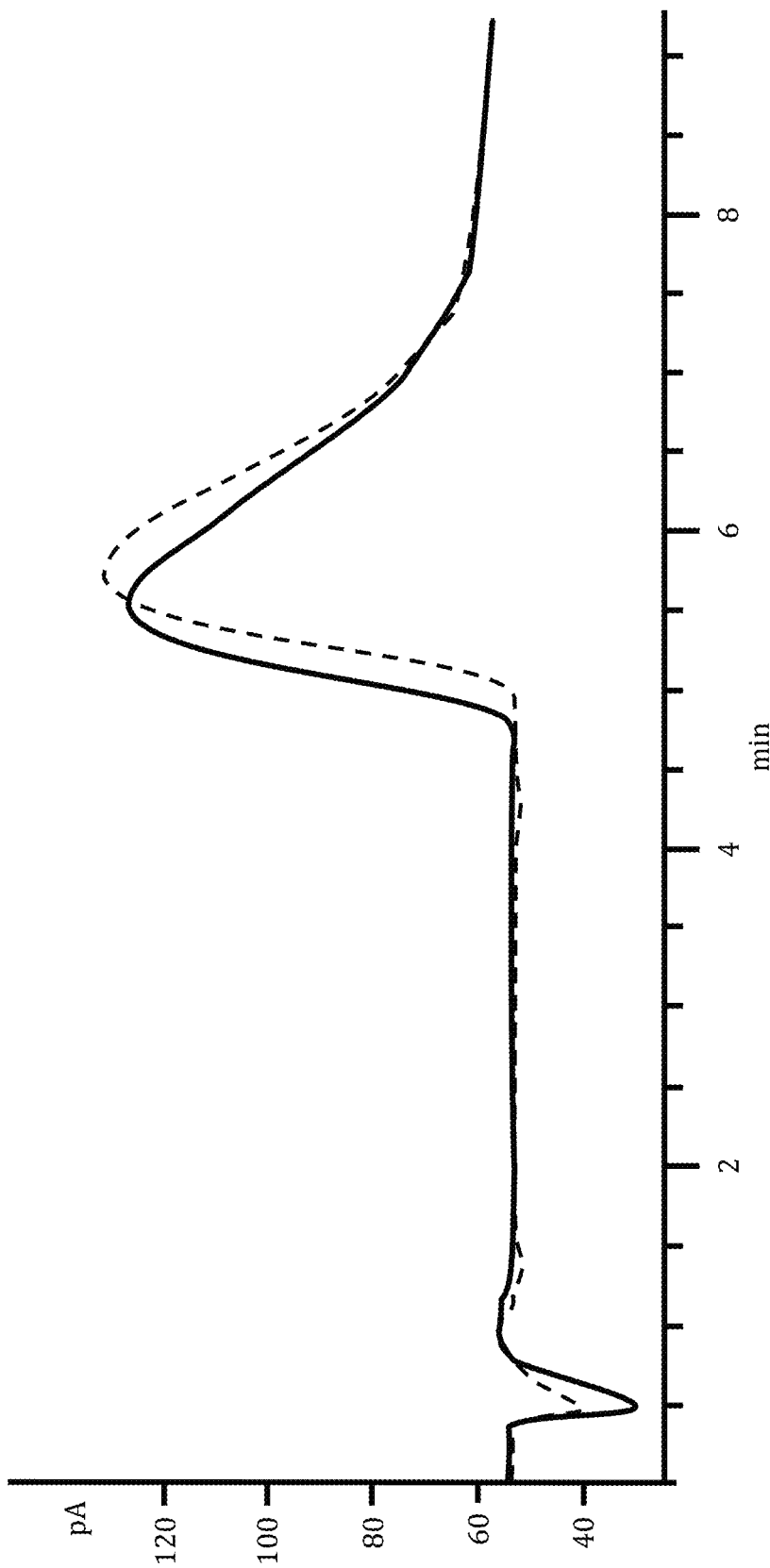
FIGS. 14 and 15 are chromatographs illustrating changes associated with analyte source replacement.

FIG. 14 is a chromatograph of injections of DMMP using a "low" concentration microcalibrator according to an embodiment of the present invention. The solid line trace resulted from an injection made while a DMMP analyte source was coupled to the microcalibrator. The dashed line trace resulted from an injection made after the DMPP analyte source was replaced with an empty analyte bottle.

Figure 15:
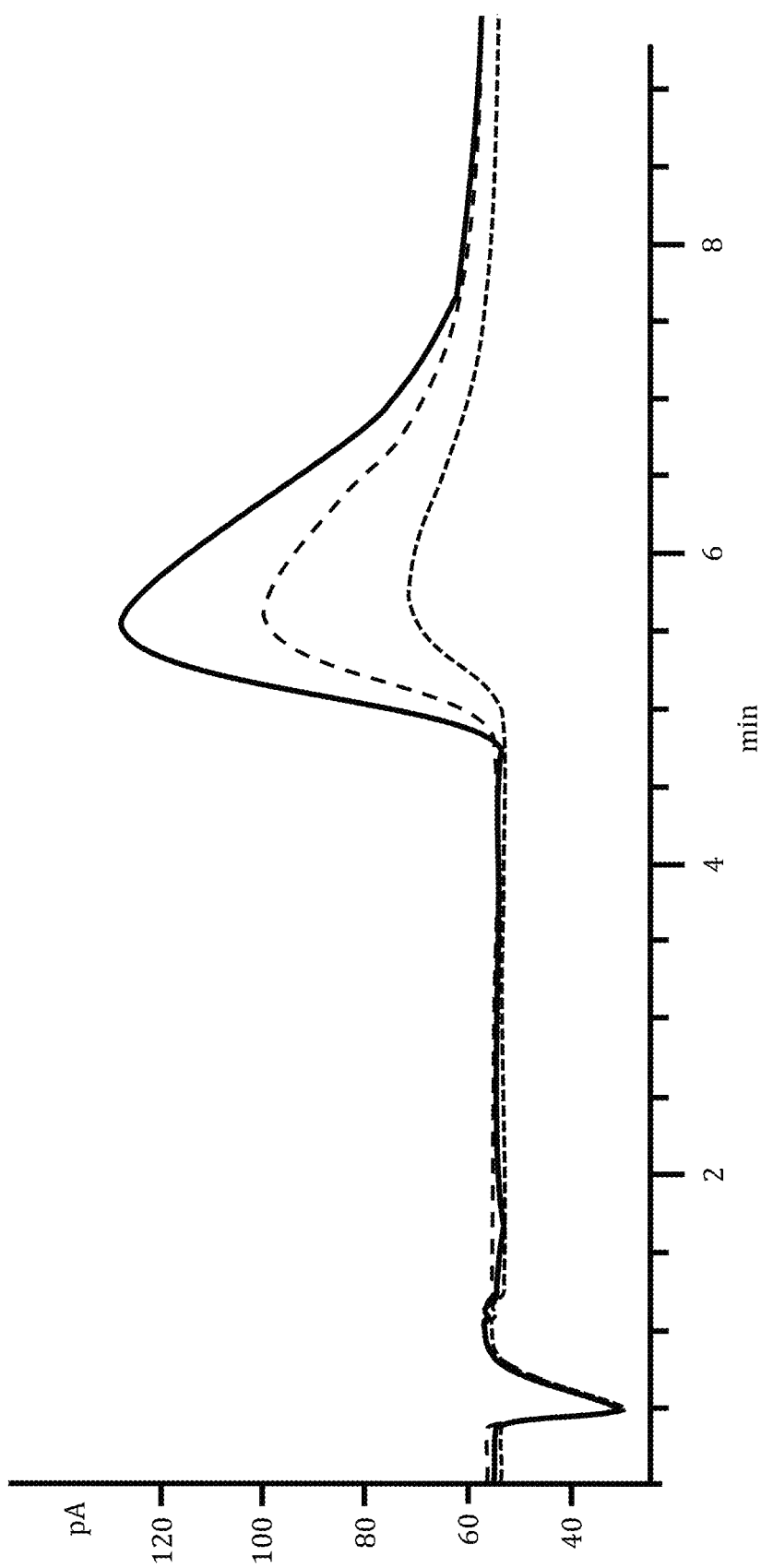

FIG. 15 is also a chromatograph resulting from injections of DMMP using the "10 ng" microcalibrator. The solid line trace resulted from the first injection after the DMMP analyte source was replaced with an empty analyte bottle. The dashed line trace resulted from a $10^{th}$ injection from the empty analyte bottle. The dotted line trace results from the $23^{rd}$ injection from the empty analyte bottle.

Comparison of the chromatographs within each of FIGS. 14 and 15 suggests there may be dosing of the solid sorbent with the analyte and priming the microcalibrator may be necessary prior to use for calibration. The analyte peak does subside, which may suggest the PEEK, TEFLON, or both may play a role in dosing.

Use of inert tubing may resist the demonstrated analyte memory retention.

And so, particularly when a low vapor pressure analyte, heating the analyte source, one or more fluid lines within the microcalibrator, or both may be necessary to resolve vapor pressure retention issues.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A microcalibrator for solventless calibration of an analytical instrument, the microcalibrator comprising:
    a fluid path having a first end configured to be operably coupled to a fluid source and a second end configured to be operably coupled to the analytical instrument; and
    a first solid sorbent disposed along the fluid path, the first solid sorbent configured to absorb an analyte at a first concentration; and
    a second solid sorbent disposed along the fluid path, the second solid sorbent configured to absorb the analyte at a second concentration, wherein the first solid sorbent and the second solid sorbent are positioned in parallel along the fluid path;
    wherein flow of the analyte along the fluid path from the first end causes the analyte to absorb onto the first solid sorbet and the second solid sorbent and wherein flow of a fluid along the fluid path from the first end to the second end causes absorbed analyte to be desorbed from the first solid sorbent, the second solid sorbent, or both, to establish at least a two-point calibration curve.

2. The microcalibrator of claim 1, further comprising:
    a hub for receiving an analyte source having the analyte therein, the hub being fluidically coupled to the fluid path.

3. The microcalibrator of claim 2, wherein the hub is configured to engage a pierceable septum of the analyte source.

4. The microcalibrator of claim 1, further comprising:
    a hotplate operably coupled to the first and second solid sorbents.

5. The microcalibrator of claim 1, wherein the first solid sorbent and the second solid sorbent are separately selected from the group consisting of graphitized carbon black, activated carbon, a porous polymer, or a xerogel.

6. The microcalibrator of claim 1, further comprising:
    a carbon trap along the fluid path.

7. The microcalibrator of claim 1, further comprising:
    a controller configured to operate a flow of fluid along the fluid path.

8. The microcalibrator of claim 1, further comprising:
    a valve configured to divert fluid flow between the first solids sorbent and the second solid sorbent.

9. The microcalibrator of claim 1, wherein the fluid path, the first solid sorbent, the second solid sorbent, or a combination thereof are configured to be heated for facilitating desorption of low vapor pressure analytes.

* * * * *